United States Patent [19]

Ito et al.

[11] Patent Number: 5,285,045
[45] Date of Patent: Feb. 8, 1994

[54] LASER PROCESSING APPARATUS

[75] Inventors: Susumu Ito; Hikoharu Aoki, both of Nagoya; Yuji Miwa, Chita; Akihiko Oshima, Bisai, all of Japan

[73] Assignee: Brother Kogyo Kabushiki Kaisha, Nagoya, Japan

[21] Appl. No.: 922,388

[22] Filed: Jul. 31, 1992

[30] Foreign Application Priority Data

Oct. 25, 1991 [JP] Japan .................. 3-279747

[51] Int. Cl.$^5$ ............................. B23K 26/00
[52] U.S. Cl. ..................... 219/121.77; 219/121.76
[58] Field of Search .................. 219/121.76, 121.77

[56] References Cited

U.S. PATENT DOCUMENTS 4,885,448  12/1989  Kasner et al. .................. 219/121.69

Primary Examiner—C. L. Albritton
Attorney, Agent, or Firm—Oliff & Berridge

[57] ABSTRACT

A laser processing apparatus which is high in production efficiency, and capable of easily and automatically changing processing heads from one to another according to the type of the thermal processing to be done is disclosed. The laser processing apparatus includes a plurality of processing heads composed of a processing head for cutting work, a processing head for welding work and a processing head for hardening work. The laser processing apparatus moves one processing head toward a processing position with respect to the frame having a laser beam generator by a processing head driving unit. The apparatus includes a workpiece moving system for moving a workpiece with respect to the processing head positioned in the processing position. Therefore, a compact laser processing apparatus, high in production efficiency, and which is capable of selecting an optimum processing head from processing heads according to the type of the thermal processing to be done, results.

20 Claims, 11 Drawing Sheets

LASER PROCESSING APPARATUS

BACKGROUND OF THE INVENTION

1. Field of the Invention

The present invention relates to a laser processing device.

2. Description of Related Art

Conventionally, as laser processing apparatus of this type, there have been known those which perform thermal processing, such as cutting, welding and heating, by radiating a laser beam on the surface of a workpiece. As an example, reference is here made to the apparatus shown in FIG. 6.

The reflection mirror 53 is for changing the travelling direction of a laser beam 52 emitted from a laser beam generator 51. And, the laser beam reflected by the reflection mirror 53 is incident on a processing head 54.

A workpiece 55 is disposed just under the processing head 54 and in a fixed state to a moving device 56. The moving device 56 is moved while the laser beam 52 is radiated onto the workpiece 55, whereby a spot of the laser beam 52 formed on the workpiece 55 moves in a relative manner. In this way, a predetermined thermal processing is applied to the workpiece 55 using the laser beam 52.

As an example of such thermal processing, cutting work will be explained below. As shown in FIG. 7, the condenser lens 57 is disposed fixedly in the interior of the processing head 58. The laser beam 52 which is incident on the processing head 58 passes through the condenser lens 57 while being converged by the same lens. Then the workpiece 55 is melted in the position of the focus point 59 of the laser beam 52. As a result, the portion of the workpiece 55 melted as molten metal 60 by the laser beam 52 is blown off by the strong stream of the processing gas 61 which is active gas, e.g., oxygen gas, to form cut slot 62 in the workpiece 55.

In welding work, the laser beam needs to have a higher power output than the laser beam used in the cutting work. Therefore, a parabolic mirror which has a high strength under high-light or high-heat conditions, as compared with the condenser lens, is conventionally used. As shown in FIG. 8, a plane reflective mirror 63 and the parabolic mirror 64 which is disposed opposite to the plane reflective mirror 63 are disposed fixedly in the interior of the processing head 65. The laser beam 52 incident on the processing head 65 is reflected from the plane reflective mirror 63 and is incident on the parabolic mirror 64. After the travelling direction of the laser beam 52 is changed by the parabolic mirror 64, the laser beam 52 is converged and the converged laser beam 52 is radiated on the workpiece 55. Then, the workpiece 55 is melted in the position of the focus point 66 of the laser beam 52. At the same time, the processing gas 68 which is inert gas, e.g., argon gas, is applied weakly to the workpiece 55. As a result, the portion of the workpiece 5 melted as molten metal 67 by the laser beam 52 is covered with a weak stream of the processing gas 68, and again solidifies while the oxidation thereof is prevented.

On the other hand, in heating work, such as hardening, it is required that the energy of a laser beam is distributed uniformly. Therefore, as shown in FIG. 9, a kaleidoscope 70 is disposed fixedly in the interior of the processing head 71. The laser beam 52 which is incident on the processing head 71 passes through the condenser lens 72 while being converged by the same lens. The converged laser beam 52 is incident on the kaleidoscope 70. The laser beam 52 is made to be in multiple reflection inside of the kaleidoscope 70, so that the energy distribution of the laser beam 52 becomes uniform. The laser beam 52 is radiated on the workpiece 55 after passing through the condenser lens 73. A laser beam absorbent 74 of a graphite type is coated on the surface of the workpiece 55 in order to absorb the laser beam 52 efficiently. After the workpiece 55 is rapidly heated by the radiated laser beam 52 so as to reach a hardening temperature, the workpiece 55 is rapidly cooled owing to the its heat conduction. As a result, the laser beam 52 forms a hardened portion 75 in the workpiece 55.

Thus, it is desirable to use the processing head having optical elements, such as a condenser lens, a parabolic mirror or kaleidoscope, according to the type of a thermal processing to be done. Also, if the laser processing apparatus is to perform one type of thermal processing, it is desirable to select the processing head having the optimum optical elements according to the processing conditions desired.

However, in the conventional laser processing apparatus, the processing head is semifixed or detachably fixed. Therefore, in the case of performing different types of thermal processing in such a conventional laser processing apparatus, it is necessary to change processing heads from one to another appropriately according to the type of the thermal processing to be done. In the conventional laser processing apparatus, this processing head changing operation is conducted manually, thus causing the problem of lowering production efficiency.

A known type of laser processing apparatus capable of solving the above-mentioned problem is shown in Fig. 10. The laser processing apparatus includes a frame 102, and further includes a processing head for welding work 106, a processing head for cutting work 105 and a processing head for hardening work 107, which are disposed fixedly to the frame 102 through a holder 119. Moreover, the laser processing apparatus includes a plane reflective mirror 104 which can move in order to introduce a laser beam 103 emitted from a laser beam generator 101 into the one of the three processing heads 106, 105 and 107. That is, according to the laser processing apparatus, an optimum processing head can be selected from the three processing heads 106, 105 and 107 by moving the reflective mirror 104. And, a desired thermal processing can be performed by moving a workpiece 126. The workpiece 126 is moved by a moving device 127 having a first direction feeding device 130 and a second direction feeding device 140. Therefore, there is no need to change the processing heads from one to another appropriately according to the type of the thermal processing to be done.

However, in the above-mentioned laser processing apparatus, the three processing heads 106, 105 and 107 are disposed fixedly to the frame 102. Therefore, it is necessary to provide a large space where the moving device 127 can move the workpiece, because the moving device 127 needs to move toward three positions corresponding to each processing heads 106, 105 and 107, and further to move within a processing range for processing the workpiece 126 by each processing head. For instance, as shown in the left side of FIG. 10, the moving device 127 has to be able to move to a position shown by the dotted line. Therefore, there is a problem that the size of the laser processing apparatus is increased.

SUMMARY OF THE INVENTION

The present invention solves the problems mentioned above. It is an object of the present invention to provide a small sized laser processing apparatus which is high in production efficiency, and capable of changing processing heads easily and automatically from one to another, according to the type of the thermal processing to be done.

According to the present invention, in order to achieve the above-mentioned object, there is provided a laser processing apparatus comprising a laser beam generating means for generating a laser beam; a plurality of processing heads which have different types of optical elements from each other; mounting means for mounting the plurality of processing heads; supporting means for movably supporting the mounting means; driving means for moving the mounting means; and control means for controlling the driving means to position one of the plurality of processing head at a processing position where the laser beam generated by the laser beam generating means is conducted to one of the plurality of processing heads.

In the laser processing apparatus of the present invention having the above-mentioned constitution, the plurality of processing heads are mounted by the mounting means, and the mounting means is movably supported by the supporting means. The control means positions one of the plurality of processing heads at the processing position by controlling the driving means. After such positioning, the laser beam generating means generates the laser beam and the selected processing head executes a desired thermal processing operation.

According to the present invention, since the laser processing apparatus is capable of performing thermal processing, such as cutting, welding and heating with an optimum processing head, the laser processing apparatus can produce a high-quality workpiece. Moreover, since there is no need to conduct manually the processing head changing operation, the laser processing apparatus of the present invention can improve the production efficiency. Further, the present invention can provide a compact laser processing apparatus because the laser processing apparatus has processing heads which are movably supported by the supporting means.

BRIEF DESCRIPTION OF THE DRAWINGS

A preferred embodiment of the present invention will be described in detail with reference to the following FIGURES wherein.

DETAILED DESCRIPTION OF THE PREFERRED EMBODIMENT

Hereinafter, embodiments which embody the present invention will be explained with reference to the FIGURES.

Figure 1:
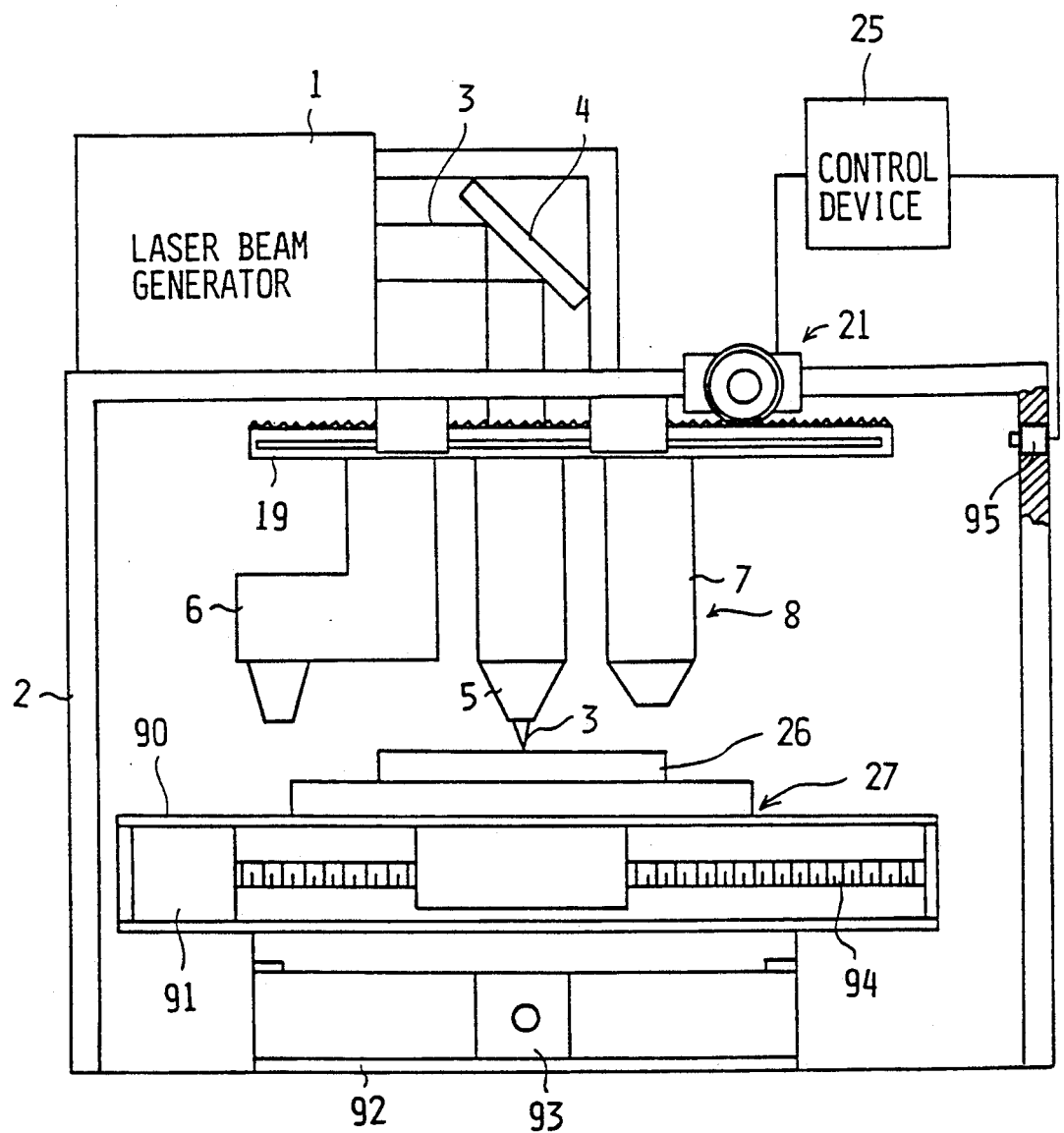
FIG. 1 is a schematic view of a laser processing apparatus.
Figure 2:
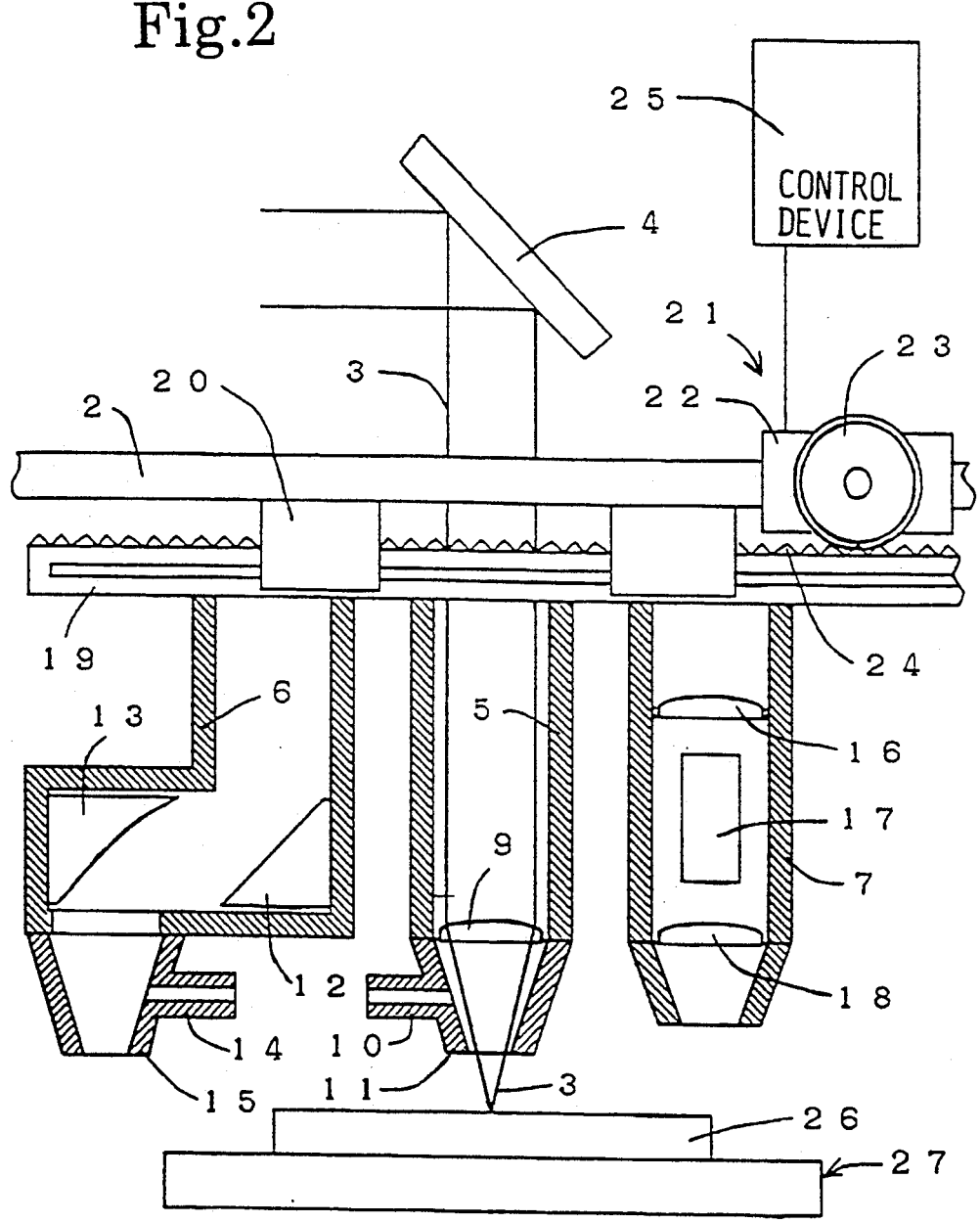
FIG. 2 is an enlarged view of a processing head and the vicinity hereof.

Referring first to FIGS. 1 and 2, the construction of a laser processing apparatus embodying the invention will be described.

The laser beam generator 1, which preferably uses a $CO_2$ laser, is disposed on a frame 2 made, for example of steel, and emits a laser beam 3 having a wavelength, for example of 10.6 $\mu$m (micro meter). The plane reflective mirror 4 is disposed fixedly on an optical path of the laser beam 3 emitted from the laser beam generator 1, and it changes the path of the laser beam 3. The laser beam 3 is incident on any one of processing heads 8, that is, a processing head for cutting work 5, a processing head for welding work 6 and a processing head for hardening work 7, which is located at a processing position.

Referring to FIG. 2, the processing head for cutting work 5 comprises a condenser lens 9 and a processing nozzle 11 having a processing gas supply port 10. The processing nozzle is disposed just under the processing head for cutting work 5.

The processing head for welding work 6 comprises a plane reflective mirror 12, a parabolic mirror 13 and a processing nozzle 15 having a processing gas supply port 14. The parabolic mirror 13 is disposed opposite to the plane reflective mirror 12. The processing gas supply port 14 is disposed just under the parabolic mirror 13.

The processing head for hardening work 7 comprises a condenser lens 16 on which the laser beam 3 is incident, a kaleidoscope 17 and a condenser lens 18 from which the laser beam 3 issues.

The processing head for cutting work 5, the processing head for welding work 6 and the processing head for hardening work 7 are disposed fixedly on a processing head holder 19, respectively. The processing head holder 19 is disposed slidably under the frame 2 through a linear guide 20.

The processing head holder 19 is capable of moving relatively to the frame 2 by a processing head driving unit 21. The processing head driving unit 21 comprises a driving motor 22 disposed fixedly on the frame 2, a pinion 23 and a rack device 24. The pinion 23 is driven by the output shaft of the driving motor 22. The rack device 24 is disposed fixedly on the processing head holder 19 so as to mesh with the pinion 23. The driving motor 22 is controlled by a control device 25 so as to drive the pinion 23.

A stepping motor is used as the driving motor 22. The control device 25 controls the rotation of the pinion 23 by controlling a number of driving pulses which are supplied to the driving motor 22. As shown in FIG. 1, a microswitch 95 is provided at the right upper position of the frame 2. The microswitch 95 is electrically connected to the control device 25. The microswitch 95 supplies a reference position signal to the control device 25 when the right end of the processing head holder 19 depresses the microswitch 95.

The control device 25 stores driving pulse numbers necessary for positioning the processing heads 5, 6 and 7 in the processing position from a reference position detected by the microswitch 95. Accordingly, the control device can orient a desired processing heads at the processing position based on the stored driving pulse numbers, after the reference position is detected by the microswitch 95. The reference position represented by microswitch 95 is achieved each time a processing head repositioning operation takes place by first driving motor 21 so that the holder 19 engages microswitch 95.

A workpiece 26 is fixed onto a moving device 27, and is disposed just under the processing heads 8. The moving device 27 is moved while the laser beam 3 is radiated onto the workpiece 26, thereby causing relative movement of a spot of the laser beam 3 formed on the workpiece 26, so that a predetermined thermal processing is completed.

The moving device 27 comprises a first direction feeding device 90 and a second direction feeding device 92 for moving the workpiece 26 toward a desired position in a horizontal plane. The first direction feeding device 90 has a ball screw 94 extending in the first direction and a motor 91 for rotating the ball screw 94. The second direction feeding device 92 has a ball screw (not shown) extending in the second direction orthogonal to the first direction and a motor 93 for rotating the ball screw.

Figure 3:
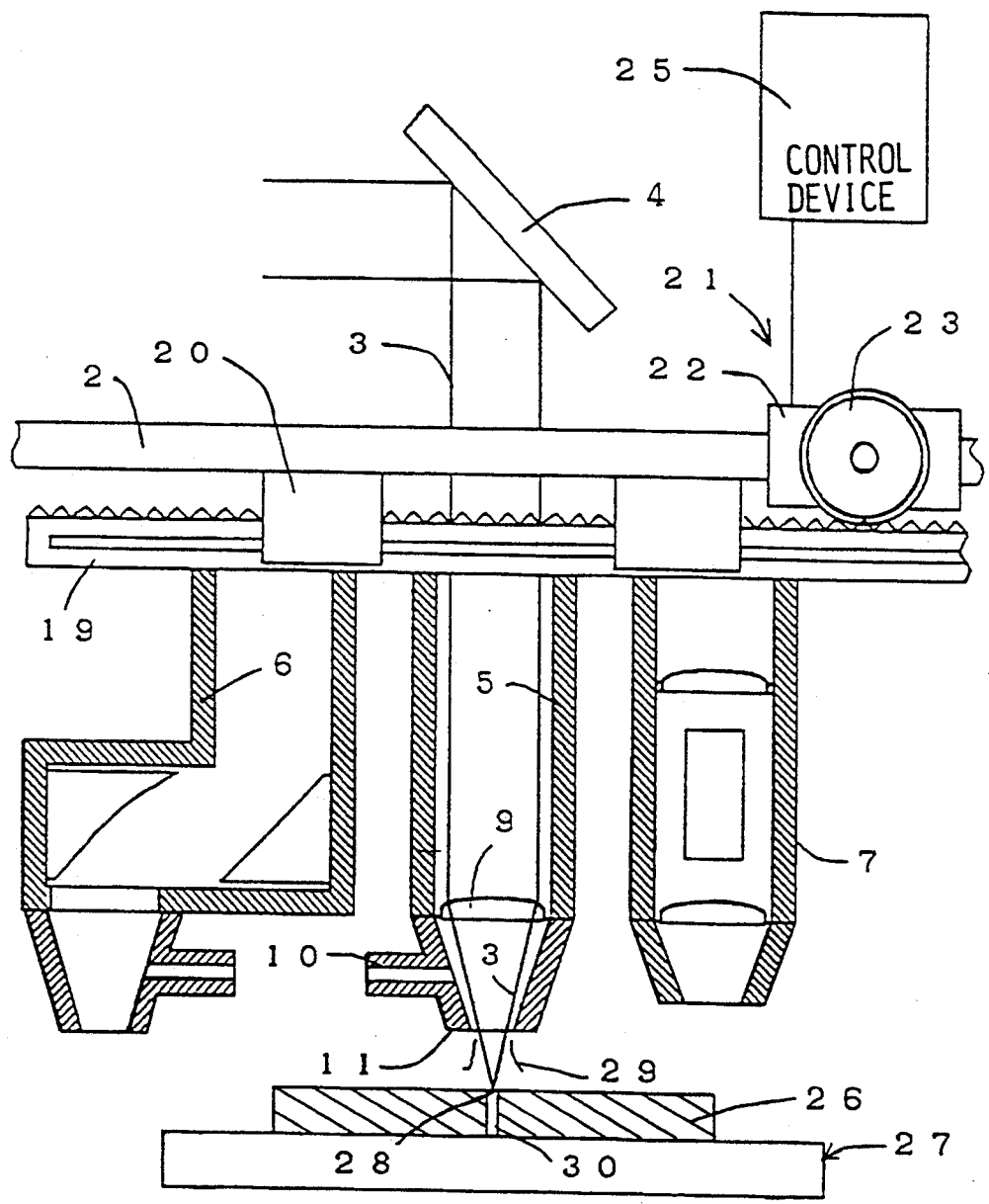
FIG. 3 is a view showing a cutting operation using the laser processing apparatus in this embodiment.

The following is a description of a cutting operation using the laser processing apparatus in this embodiment with reference to FIG. 3.

When cutting is to be done, the processing head holder 19 is driven so that the laser beam 3 is aligned with and passes through the axis of the processing head for cutting work 5 held by the processing head holder 19. That is, the processing head for cutting work 5 is moved into alignment by the processing head holder 19. The processing head holder 19 is driven while the processing head driving unit 21 is controlled by the control device 25. That is, when the driving motor 22 is driven, the pinion 23 is driven, so that the rack device 24 engaging with the pinion 23 is driven thereby moving the processing head holder 19.

The laser beam 3 which is incident on the processing head for cutting 5 passes through the condenser lens 9 while being converged by the same lens. Then the workpiece 26 is melted in the position of the focus point 28 of the laser beam 3. A processing gas 29 which is an active gas, e.g., oxygen gas, is fed through the processing gas supply port 10 and jets from the processing nozzle 11 along the axis of the laser beam 3. As a result, the portion of the workpiece 26 melted by the leaser beam 3 is blown off by the strong stream of the processing gas 29, to cut slot 30 in the workpiece 26. The workpiece 26 is moved by the moving device 27, and in this way, predetermined cutting work is completed.

Figure 4:
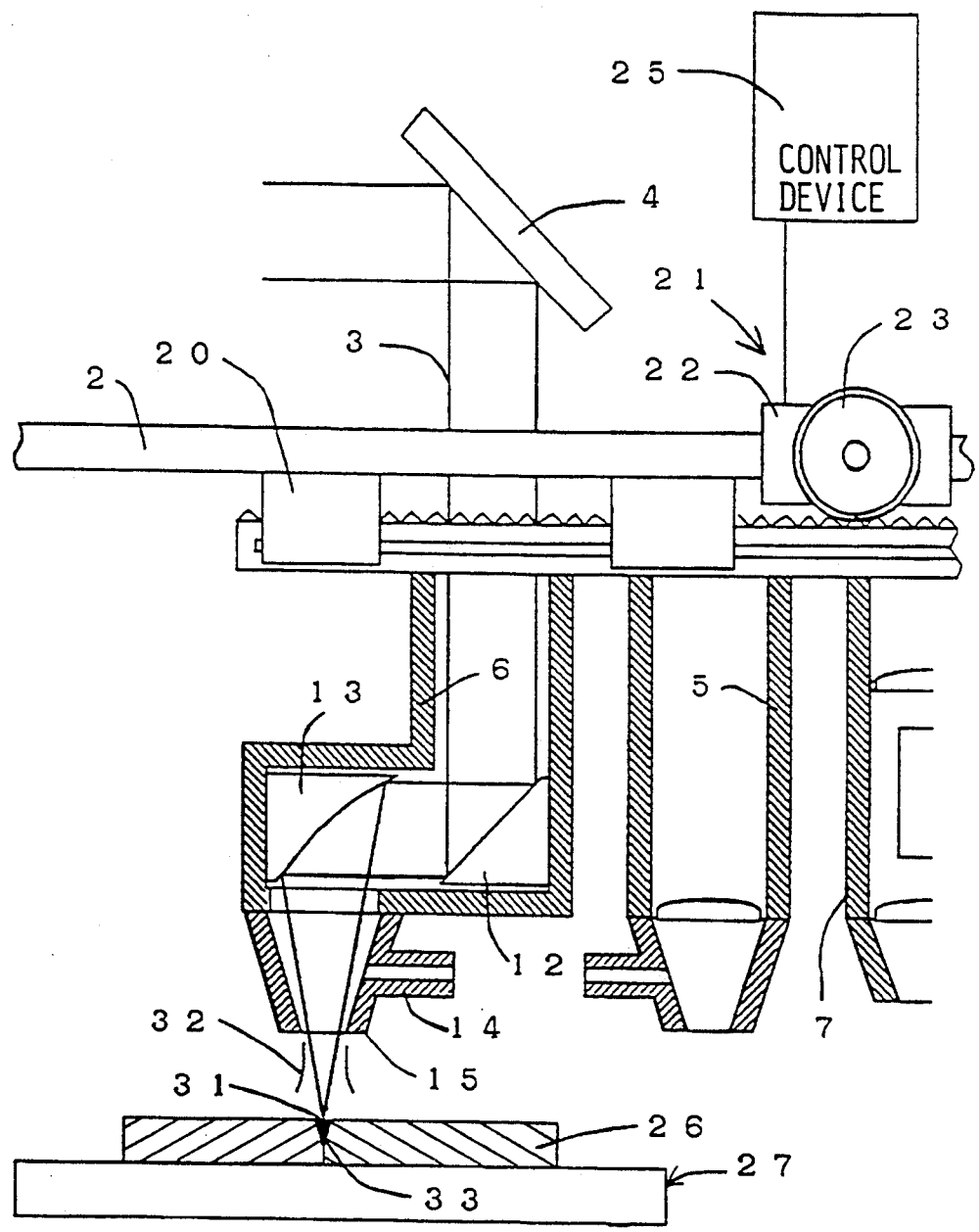
FIG. 4 is a view showing a welding operation using the laser processing apparatus in this embodiment.

Referring now to FIG. 4, a welding operation using the laser processing apparatus in this embodiment will be described below.

In welding, the processing head holder 19 is driven so that the laser beam 3 is aligned with and passes through the axis of the processing head for welding 6 held by the processing head holder 19. That is, the processing head for welding 6 is moved by the processing head holder 19. The processing head holder 19 is driven while the processing head driving unit 21 is controlled by the control device 25.

The laser beam 3 incident on the processing head for welding 6 is reflected on the plane reflective mirror 12 and is incident on the parabolic mirror 13. After the travelling direction of the laser beam 3 is changed by the parabolic mirror 13, the laser beam 3 is converged. The converged laser beam 3 is radiated on the workpiece 26. Then the workpiece 26 is melted in the position of the focus point 31 of the laser beam 3. A processing gas 32, which is an inert gas, e.g., argon gas, is fed through the processing gas supply port 14 and jetted under low pressure from the processing nozzle 15 while passing coaxially of the laser beam 3. As a result, the portion of the workpiece 26 melted by the laser beam 3 is covered with a weak stream of the processing gas 32, and again solidifies while the oxidation thereof is prevented, to form weld 33 in the workpiece 26. The workpiece 26 is moved by the moving device 27, and in this way, predetermined welding is completed.

Figure 5:
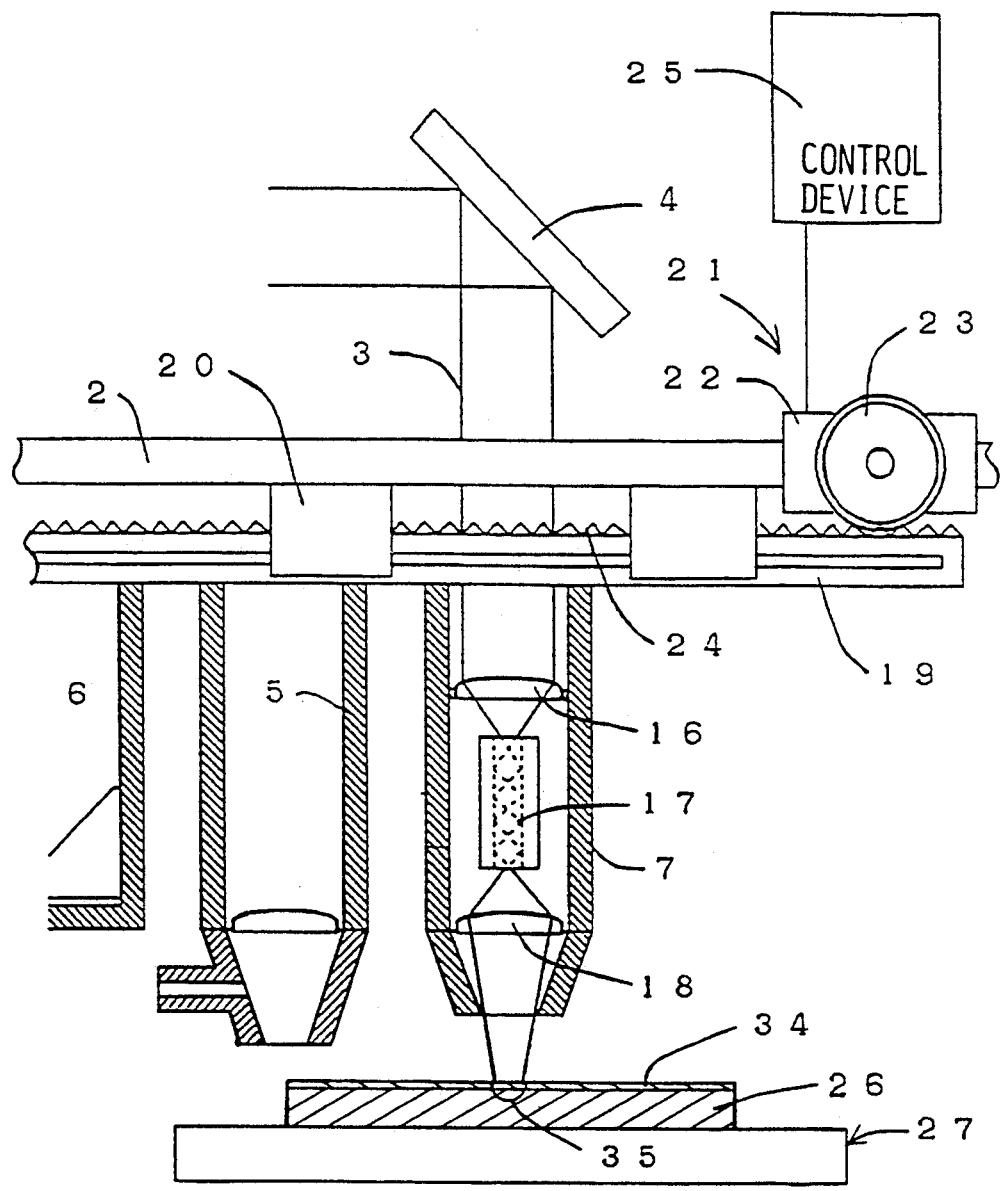
FIG. 5 is a view showing a hardening operation using the laser processing apparatus in this embodiment.
Figure 6:
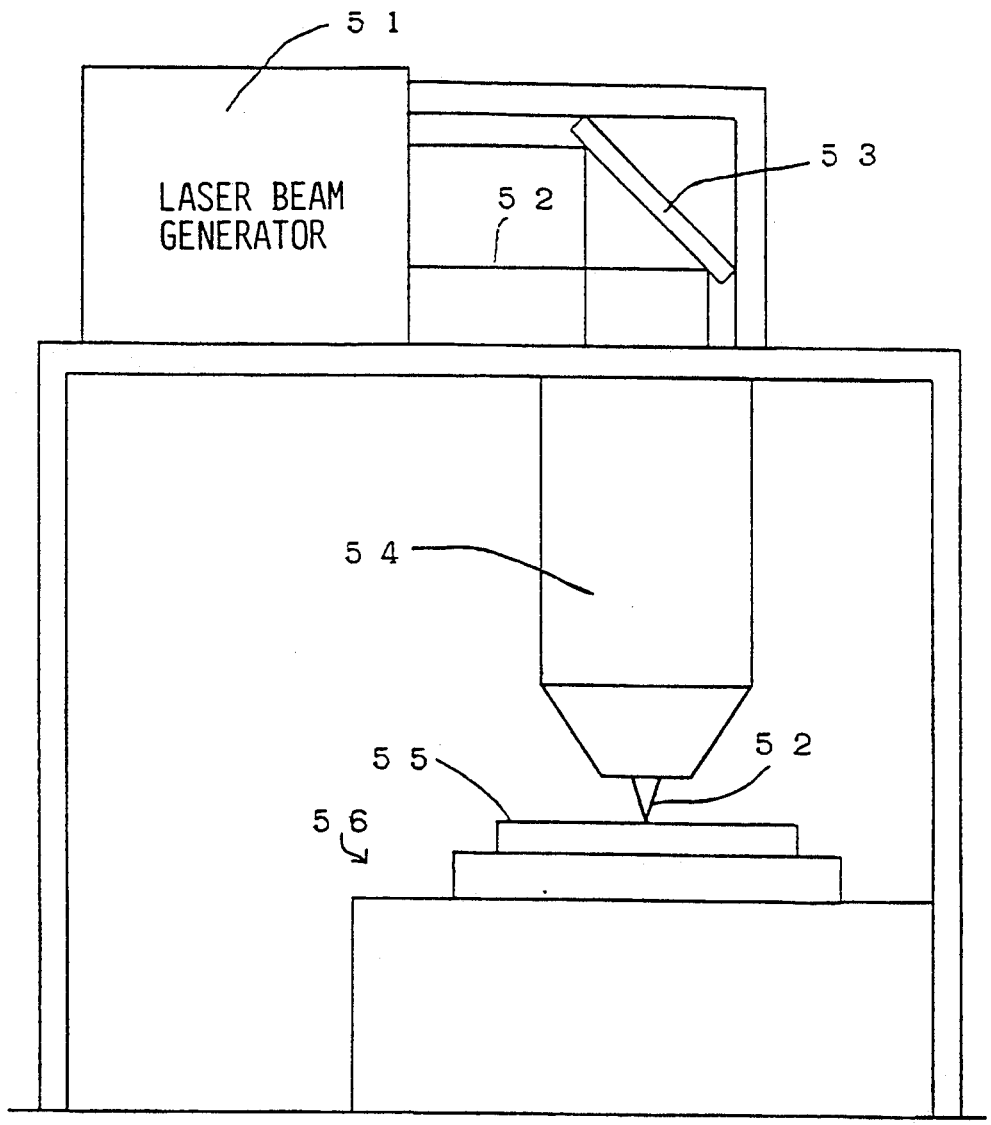
FIG. 6 is a schematic view of a conventional laser processing apparatus.
Figure 7:
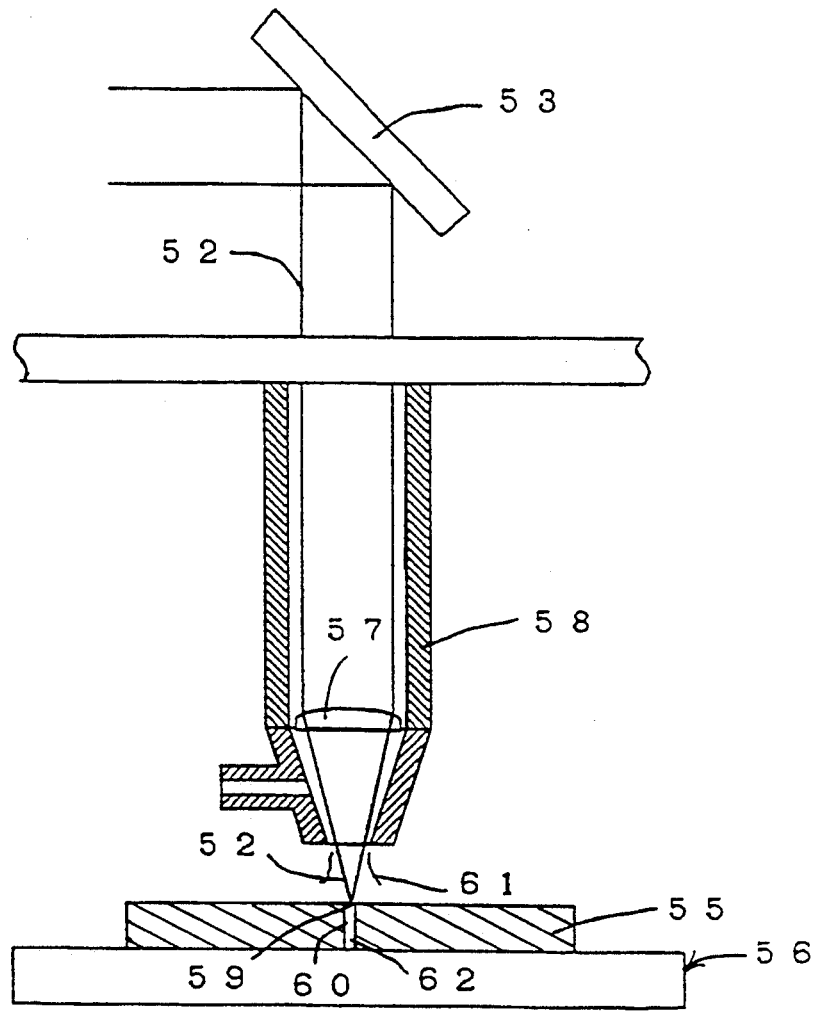
FIG. 7 is a view showing a cutting operation using the conventional laser processing apparatus.
Figure 8:
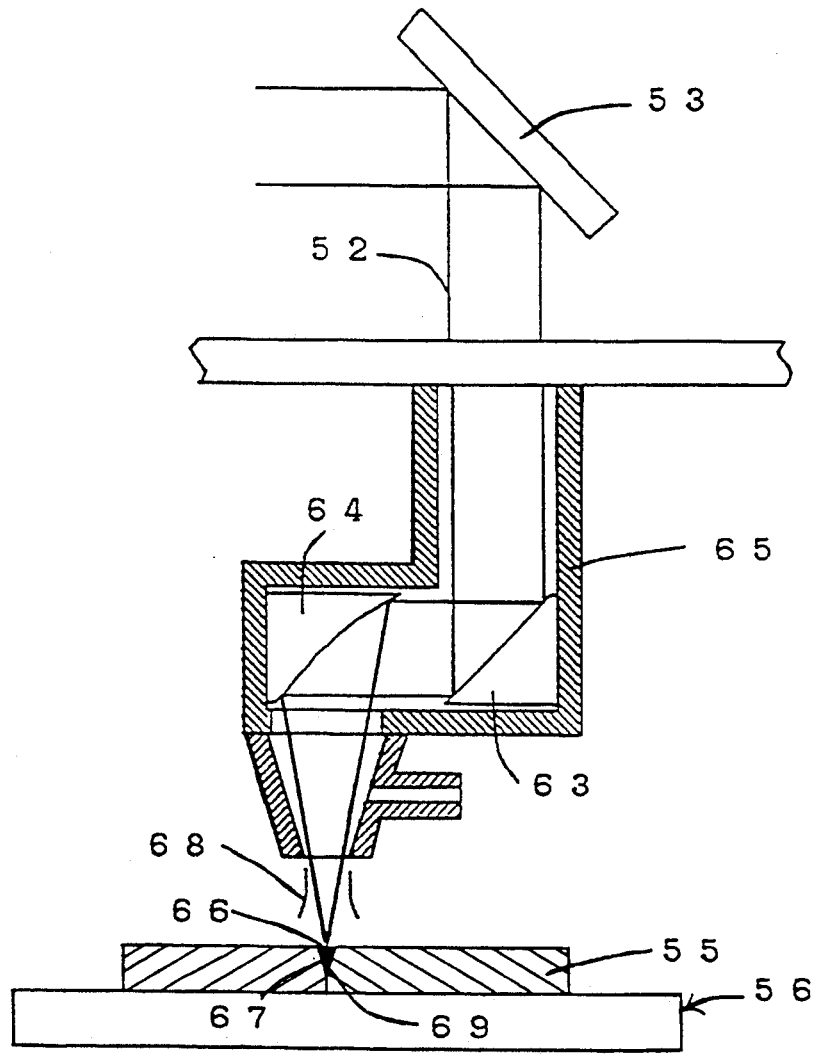
FIG. 8 is a view showing a welding operation using the conventional laser processing apparatus.
Figure 9:
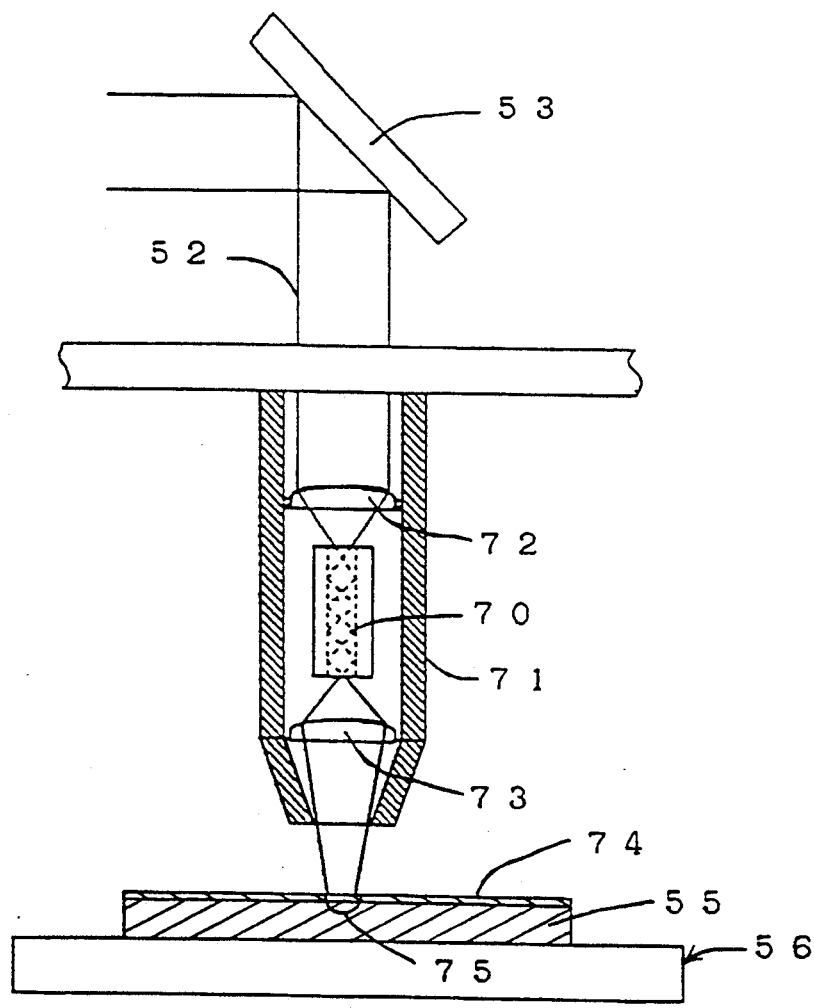
FIG. 9 is a view showing a hardening operation using the conventional laser processing apparatus.
Figure 10:
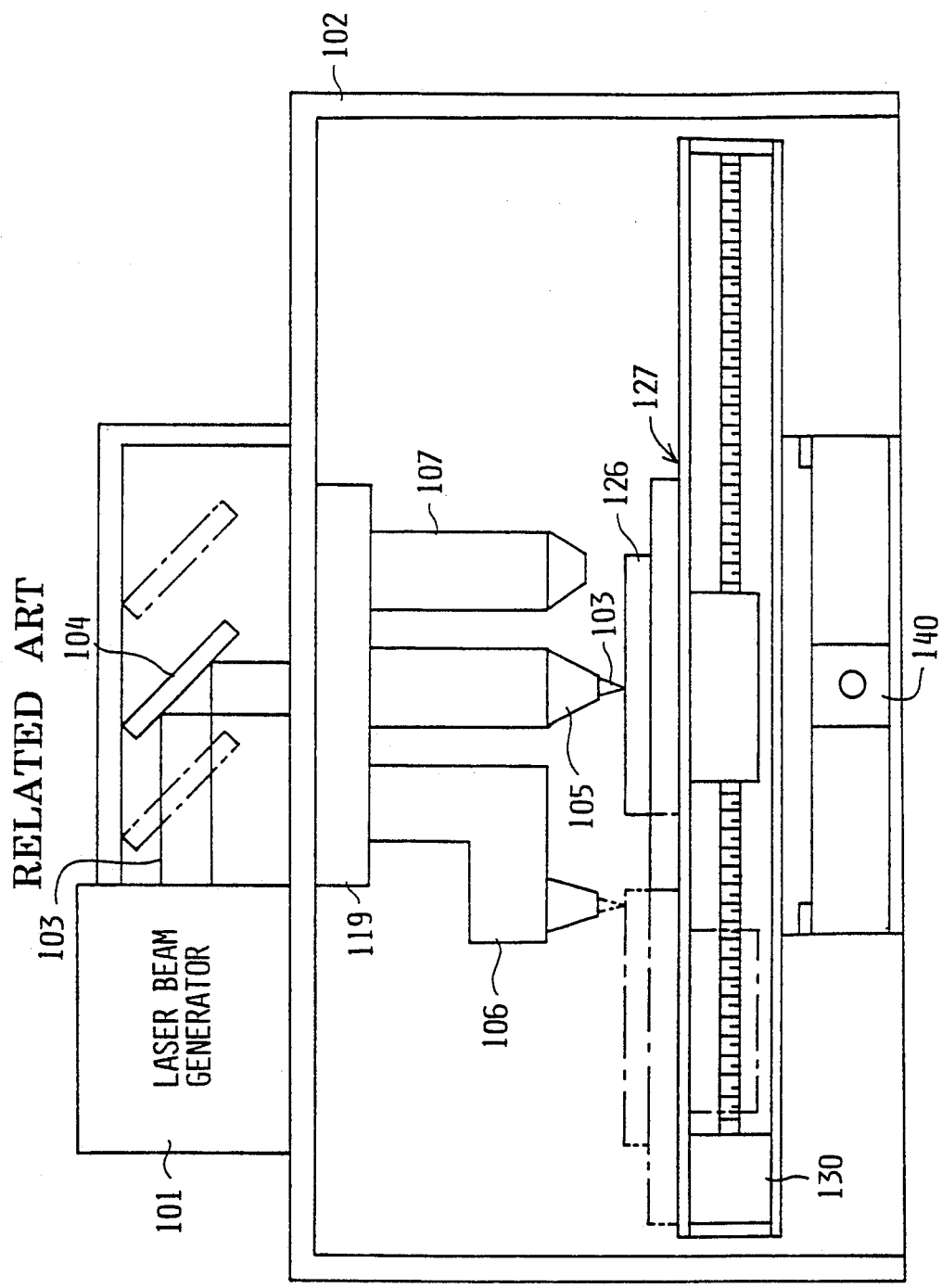
FIG. 10 shows another known type of laser processing apparatus having fixed processing heads.

Referring now to FIG. 5, a hardening operation using the laser processing apparatus in this embodiment will be described below.

In hardening, the processing head holder 19 is driven so that the laser beam 3 is aligned with and passes through the axis of the processing head for hardening 7 held by the processing head holder 19. That is, the processing head for hardening 7 is moved by the processing head holder 19. The processing head holder 19 is driven while the processing head driving unit 21 is controlled by the control device 25.

The laser beam 3 which is incident on the processing head for hardening 7 passes through the condenser lens 16 and is converged by that lens. The converged laser beam 3 is also incident on the kaleidoscope 17. The laser beam 3 is made to be in multiple reflection inside of the kaleidoscope 17, so that the energy distribution of the laser beam 3 becomes uniform over a wider width, as compared with cutting or welding. The laser beam 3 is then radiated on the workpiece 26 after passing through the condenser lens 18 for the outgoing laser beam. A laser beam absorbent 34 of a graphite type is coated on the surface of the workpiece 26 in order to absorb the laser beam 3 efficiently. After the workpiece 26 is rapidly heated by the radiated laser beam 3 so as to reach a hardening temperature, the workpiece 26 is rapidly cooled owing to the its heat conduction. As a result, The laser beam 3 forms hardened portion 35 in the workpiece 26. The workpiece 26 is moved by the moving device 27, and in this way, a predetermined hardening operation is completed.

As obviously above-mentioned, according to the present invention, since the laser processing apparatus is capable of performing thermal processing such as cutting, welding and heating, each with an optimum processing head, the laser processing apparatus can produce a high-quality workpiece. Moreover, since there is no need to manually change the processing head, the laser processing apparatus of the present invention can improve production efficiency. Further, both the processing heads and the workpiece can be moved, thereby reducing the size of the laser processing apparatus.

This invention is not limited to the above-mentioned embodiment. It should be understood that many changes and modifications may be made in the embodiment without departing from the scope of the present invention.

For instance, a polygon mirror that is disposed fixedly in the interior of the processing head may be used for hardening work in order to distribute uniformly the energy of the laser beam 3, instead of the kaleidoscope.

Moreover, the processing head driving unit may comprise a fluid motor, such as an air cylinder. Further, any type of processing head can be used.

Figure 11:
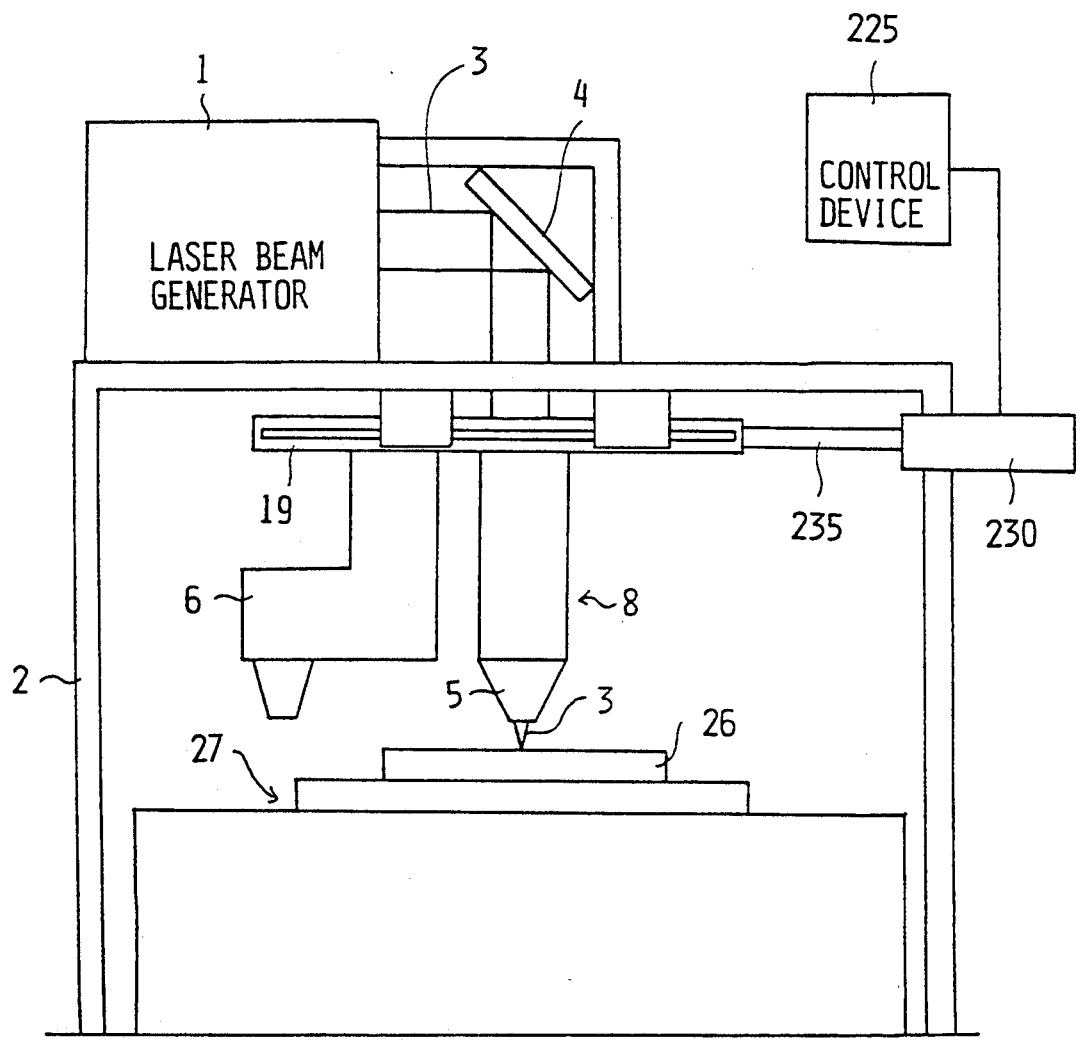
FIG. 11 shows another embodiment of the invention employing a fluid motor as a driver.

For instance, as shown in FIG. 11, the processing heads 8 may be moved by an air cylinder 230 disposed fixedly to the frame 2. A piston rod 235 of the air cylinder 230 is connected to the right side of the processing head holder 19. When a control device 225 controls the air cylinder 230 so that the piston rod 235 is projected out of the cylinder, the processing head for cutting work 5 is moved to the processing position. When the control device 225 controls the air cylinder 230 so that the piston rod 235 retracts, the processing head for welding work 6 is moved to the processing position.

What is claimed is:

1. A laser processing apparatus comprising:
   laser beam generating means for generating a laser beam;
   a plurality of processing heads each of which has at least one optical element, said at least one optical element of each processing head being of a different type than the at least one optical element of the other processing heads;
   mounting means for mounting said plurality of processing heads;
   supporting means for movably supporting said mounting means;
   driving means for moving said mounting means; and
   control means for controlling said driving means to selectively position one of said plurality of processing heads at a processing position where the laser beam generated by said laser beam generating means is conducted to a selected one of said plurality of processing heads, whereby each of said plurality of processing heads can be positioned to receive the laser beam from the laser beam generating means.

2. A laser processing apparatus as in claim 1, further comprising workpiece moving means for moving a workpiece relative to the processing head positioned at the processing position by the driving means.

3. A laser processing apparatus as in claim 2, wherein the workpiece moving means includes means for moving the workpiece in two mutually orthogonal directions.

4. A laser processing apparatus as in claim 1, wherein the supporting means includes means for movably supporting the mounting means for linear movement.

5. A laser processing apparatus as in claim 4, wherein the driving means comprises a rotable gear and a rack mounted on the mounting means for engagement by said rotatable gear.

6. A laser processing apparatus as in claim 4, wherein the driving means comprises a fluid cylinder for driving the mounting means.

7. A laser processing apparatus as in claim 1, wherein the plurality of processing heads comprise a cutting head, a welding head and a heat treating head.

8. A laser processing apparatus as in claim 5, further comprising reference position detecting means for detecting a reference position of said mounting means.

9. a laser processing apparatus as in claim 8, wherein said driving means includes a stepping motor for driving the rotatable gear, and wherein said control means includes storing means for storing driving pulse numbers necessary for said stepping motor in order to move each processing head from the reference postion to the processing position.

10. A laser processing apparatus comprising:
   a frame;
   a laser beam source mounted on the frame to provide a laser beam at a processing position;
   a plurality of processing heads for applying the laser beam to a workpiece;
   a mounting means for movably mounting the processing head on the frame;
   driving means for moving the mounting means;
   control means for controlling the driving means to selectively position one of the processing heads in the processing position to receive the laser beam from the laser beam source, whereby each of said plurality of processing heads can be positioned to receive the laser beam from the laser beam generating means; and
   workpiece holding means for positioning a workpiece for receiving a laser beam from the processing head located at the processing position.

11. A laser processing apparatus as in claim 10, wherein the mounting means is mounted for linear movement.

12. A laser processing apparatus as in claim 11, wherein the driving means comprises a rotatable gear and a rack mounted on the mounting means and engageable by the rotatable gear.

13. A laser processing apparatus as in claim 11, wherein the driving means comprises a fluid cylinder.

14. A laser processing apparatus as in claim 10, wherein the workpiece holding means includes means for moving the workpiece in two mutually orthogonal directions.

15. A laser processing apparatus as in claim 10, wherein the plurality of processing heads comprises a cutting head, a welding head and a heat treating head.

16. A laser processing apparatus as in claim 12, further comprising reference position detecting means for detecting a reference position of said mounting means.

17. A laser processing apparatus as in claim 16, wherein said driving means includes a stepping motor for driving the rotatable gear, and wherein said control means includes storing means for storing driving pulse numbers necessary for said stepping motor in order to move each processing head from the reference position to the processing position.

18. A laser processing apparatus comprising:
   a laser beam source;
   a plurality of processing heads for applying the laser beam to a work piece;
   a mounting means for mounting the plurality of processing heads;
   supporting means for movably supporting the processing heads;
   driving means for moving the mounting means; and
   control means for controlling the driving means to selectively position one of the processing heads at a processing position wherein said one processing head receives the laser beam from the laser beam source for applying the laser beam to a workpiece, whereby each of said plurality of processing heads can be positioned to receive the laser beam from the laser beam generating means.

19. A laser processing apparatus as in claim 18, further comprising reference position detecting means for detecting a reference position of said mounting means.

20. A laser processing apparatus as in claim 19, wherein said driving means includes a stepping motor, and wherein said control means includes storing means for storing driving pulse numbers necessary for said stepping motor in order to name each processing head from the reference position to the processing position.

* * * * *